United States Patent [19]

Kos et al.

[11] Patent Number: 5,401,294
[45] Date of Patent: Mar. 28, 1995

[54] METHOD TO SEPARATE METALLIC PHASES FROM OTHER PHASES CONTAINING SAME AND DEVICE TO CARRY OUT THE METHOD

[76] Inventors: Bernd Kos, Endresgasse 11; Harald Marhold, Stollenweg 11/10, both of 8700 Leoben, Austria

[21] Appl. No.: 989,025
[22] PCT Filed: Jul. 10, 1992
[86] PCT No.: PCT/AT92/00091
§ 371 Date: Apr. 29, 1993
§ 102(e) Date: Apr. 29, 1993
[87] PCT Pub. No.: WO93/01321
PCT Pub. Date: Jan. 21, 1993

[30] Foreign Application Priority Data

Jul. 11, 1991 [AT] Austria .................. 1398/91

[51] Int. Cl.⁶ .................. C22B 9/02; C22B 21/06
[52] U.S. Cl. .................. 75/404; 75/672; 266/204
[58] Field of Search .................. 75/404, 672; 266/204

[56] References Cited

U.S. PATENT DOCUMENTS 2,404,364 7/1946 Cooper et al. .................. 75/404
2,716,603 8/1955 Emley et al. .................. 75/404
3,537,695 11/1970 Robinson, Jr. et al. .................. 266/204
4,575,392 3/1986 Julliard.

*Primary Examiner*—Melvyn J. Andrews
*Attorney, Agent, or Firm*—Sandler Greenblum & Bernstein

[57] ABSTRACT

The invention concerns a process for de-metallization of metal-containing residues, dross, slags and the like that accumulate during thermal processes in metallurgical and scrap metal reclamation processes which consists of that the metal/non-metal phase mixture is fed into a centrifuge mold at a temperature within the mentioned temperature range or after having been fed into it is brought to the temperature mentioned, there in a first process phase, while maintaining the temperature within the mentioned range, it is subjected to radial acceleration for a specified time until a required degree of de-metallization is achieved and that in a second phase of the process by maintaining the radial acceleration by means of rotation at least the metallic phase, separated and removed from the phase mixture and arranged on the outside periphery is brought to solidification or setting by lowering its temperature, after which the metal phase when reaching the handling temperature is removed as at least one body whose outer surface corresponds essentially to the shape of the inside of the centrifuge mold and whose inside has a paraboloidal or cylindrical surface. It also includes the preferred devices for the implementation thereof.

9 Claims, 3 Drawing Sheets

METHOD TO SEPARATE METALLIC PHASES FROM OTHER PHASES CONTAINING SAME AND DEVICE TO CARRY OUT THE METHOD

The invention concerns a method for a disposing and/or recycling extraction, reclamation and/or separation of at least one metallic phase from at least one phase containing same and being different from it and occurring during thermal metal extraction, production, recycling processing and/or treatment, with an essentially inorganic nature as well as devices to carry out the method and their application.

Practically in all types of extraction and processing of metals or metal compounds, which include in many cases thermal processes, like, for example, smelting, remelting, melting down, liquation, reduction, precipitation and the like, slags, salt slags, dross and similar residues as well as metal waste materials will occur, which contain frequently considerable amounts of metal in an elementary form. There is, however, the disadvantage in the reclamation of these metal components that the metallic phase is distributed extremely thinly and often irregularly in the non-metallic phase which surrounds it or which has downright "intergrown" with it. For example, aluminum in metallic form can be present in aluminum dross up to 80% by mass.

In accordance with the continually stricter environmental regulations the metal content in the metal processing residues and the like cannot be disposed of in a conventional manner and the residues must be taken to special dumping places, resulting in considerable and rapidly increasing expenses. When using fluxing agents and the metal-containing salt slags occurring in these cases, in addition to the metal content there is the additional problem of large quantities of water soluble salts, containing environmentally damaging ions, in particular halides.

Thus the natural minimization of metal losses due to economical reasons in the above described partially metallurgical processes will diminish to an increasing degree in comparison with the ecological endeavor, namely to separate the metals to a great degree from the described residues to bring about a relief to the environment in this field and subsequently to avoid or at least to reduce to a great extent the exorbitantly increasing follow-up expenses arising from the special dumping. When using salt slags, according to a relevant demetallization with increased effectiveness, a recycling in the smelting, remelting and smelt cleaning processes may be contemplated by a purposeful new type of process management. Thus, a considerable reduction of the amount of salt, finishing up at a dump, as well as substantial operating cost saving would be achieved.

A great number of metallurgical processes exist concerned with the described problem, in which, for example, phases enriched with valuable metal are separated from phases of lesser value or undesirable metal impurities, e.g. brittle phases.

All processes developed so far to reclaim metals finely distributed in other phases are based on achieving a coagulation of the fine droplets of the metal, which is present in molten condition, into larger aggregates, which then can flow out from the mixture through the pores, cracks or channels or which due to their no longer finely dispersed state separate out of the molten slag by gravitation based on the fact that their density is different from that of the slag.

At the same time it has also become known to reduce the wettability of the solid phase through the metal in case of dross and essentially solid residues and thus to promote the flow off of the molten phase or otherwise to increase the coalescence and metal yield by squeezing with presses having the most varying dies and screws.

It has also become known to produce the necessary agglomeration by means of stirring.

Furthermore, a prior U.S. patent, whose subject is a method to squeeze out the hot dross from molten aluminum, reports about unfinished experiments which have never gone outside the laboratory, using a mechanical process like centrifuging to separate aluminum from the dross and about the difficulties to transfer this process in industrial dimensions, while the problems are shown as inherent ones for the slag/dross metal system (due to blockage), therefore essentially insurmountable.

Despite this pessimistic prognosis a great number of methods and devices have been proposed to separate metals from non-metal phases containing same metals, which based on centrifuges operate in a continuous manner and discharge the separated metal in a fluid, molten condition. However, the appropriate experience in this environmentally and ecologically important field has shown that an application of the centrifuge technology has not penetrated into industry and trade despite the large number of proposals, such equipment is not being offered either and thus the forecast of the above mentioned U.S. patent cannot be refuted in practice.

The object of the invention is now a method of the kind described in the introduction, while the phase is essentially inorganic in nature and originates from the large group of non-metallic phases. The new method is particularly advantageously suitable to separate metals from slags, salt slags, dross and similar residues and metal waste materials containing the same metals in metallic condition by making use of the density differential between the phases present at least in one phase above the melting temperature.

The new method for disposing or recycling separation of a metallic phase for at least one non-metallic phase containing same from slags, salt slags, dross, residues and wastes which occur during the thermal metal extraction, production, processing, treatment and recycling, while the phase mixture for the purpose of demetallization is subjected by rotation to a radial acceleration within a centrifuge device within a temperature range which is above the melting temperature or the melting range of the metallic phase, consists essentially of that the metal/non-metal phase mixture is fed into a centrifuge mold at a temperature within the mentioned temperature range or after having been fed into it is brought to the temperature mentioned, there in a first process phase while maintaining the temperature within the mentioned range, it is subjected to radial acceleration for a specified time until a required degree of demetallization is achieved and that in a second phase of the process by maintaining the radial acceleration by means of rotation at least the metallic phase, separated and removed from the phase mixture and arranged on the outside periphery is brought to solidification or setting by lowering its temperature, after which the metal phase when reaching the handling temperature is removed as at least one body whose outer surface corresponds essentially to the shape of the inside of the centrifuge mold and whose inside has a paraboloidal or cylindrical surface.

The difference of densities between a metallic phase at or above the melting temperature and another phase or residual phase mixture is in a favorable case at least 0.1 t/m$^3$. The mixture is subjected to a rotational movement with an angular velocity, at which each spatial element of the phase mixture to be separated is subjected to at least ten times of gravity, i.e. at least 10 "g", however, preferably to 30 "g" at least.

When at every point of the mass of the phase mixture the minimum value of the radial acceleration is ensured over a period of time, making a coalescing of the most finely distributed molten metal particles feasible (essentially in the range of 1 to 20 min in case of simple process management, suitable to the spasmodic yield of the dross in the metallurgical operation, as is made possible by the invention), a high degree of de-metallization can be achieved. Under these conditions the coalescing of the metal particles is promoted, however, a "re-dispersion" of the molten metal united into larger units is prevented on the way through the pores, channels, cracks, micro-passages and spaces between grains. The method according to the invention, which is conducted deliberately in a discontinuous manner and contains preferably two consecutive process phases, has been proven excellent not only in the case of dross, but also in the case of, for example, viscous metal-containing slags. The new method gave the first practical opportunity to use the suggestion of separating metals by means of centrifuges, as suggested in a great number of publications, in an actual economically supportable and ecologically advantageous manner.

For example, in the case when aluminum containing dross is processed, beside the solidified metal ring, the metallized residues with a sand-like consistency are removed by suction with a sort of a suction apparatus and the tubular metal blank which was released from the inner wall of the centrifuge drum by cooling is removed by a corresponding grasping device. Thus the rotationary mold is available for the de-metallization of a next charge of aluminum dross, from a melting furnace different, for example, from the one where the previous charge came from. The removed metal blank after a rough cleaning by, for example, brushing or scrubbing of the adhering dross or slag residues from its hollow inside, can be fed directly into a remelting furnace, while the shape of the thin ring is particularly favorable for a rapid melting down. In case of aluminum the residues are somewhat sand-like and can be disposed of at dumps practically problem-free as their low metal residue does not effect the environment and the dump to a great degree, or otherwise may be admixed, for example, as raw material for aluminum extraction or processing in accordance with, for example, the Bayer method.

If salt slags are being used, the new method makes a clean separation of the salts from the oxide and the separated metal feasible. The salts can be admixed again problem-free as a fluxing agent to a new smelting charge, which on the one hand is environment friendly, and on the other helps to save some of the expenses for newly added salts. The metal body does not necessarily need to be tubular with a closed shape after the cooling in the mold drum; in case of drums with, for example, hexagonal cross-section, the metal phase can be formed in six equal portions, which are not attached to each other and which are collected in and removed from the region of the edges, finally solidifying as six bodies delimited by flat outer surfaces and inner cylindrical surfaces.

An embodiment enabling easier handling, uses in an advantageous manner a two or multi-staged charging wherein a first charging process described in claim 1 is conducted until the metal phase which orientates towards the outer periphery solidifies or sets and that during continuing rotation at least a second charge of the phase mixture is brought into the centrifuge mold at a temperature envisaged for the first phase of the process, that it is subjected to radial acceleration by rotation within the temperature range above the melting point of the metal phase, after which by temperature reduction at least the metal body which arranges itself within the solidified first charge and borders it, is brought to setting or solidification, and finally the formed metal phase body, having at least two layers, is removed. In this case in a surprising manner a further increase of the degree of de-metallization can be also observed. In addition to the shortening of the period of the total process, it is, of course, a particular advantage for a double or multiple quantity of to be broken up phase mixture, that due to the omission of at least one removal process, a protection of the inner wall of the mold is present by the first charge which abuts against the inner wall and fully covers it when the second charge is added. With regard to the residues of the first charge, they swim to the newly forming liquid metal ring of the second charge, therefore move inwards and unite with the de-metallized residues of the second charge.

In case of the above described double and multi-charging one can also act in such a manner as it is covered by that version of the method which is also easy regarding the handling wherein a first charge of the phase mixture is subjected to the first process phase and that during continued rotation at least a second charge of the phase mixture is fed into the centrifuge mold at a temperature envisaged for the first process phase, it is subjected there to radial acceleration by rotation within a temperature range above the melting point of the metal phase, followed by the solidification or setting of the one-piece metal body and, filially, by its removal. An intermediate cooling of the first charge is omitted, as the metal remains in the liquid state and thus one single, often even a less contaminated metal body is formed.

As it has been already explained partly above, a kind of method is especially favored wherein a to be de-metallized slag, salt slag or dross from the metal extraction, production or recycling of aluminum and aluminum alloys is used and an essentially tubular metal body is removed. The tubular metal bodies obtained in this case are mechanically stable, can be stacked, can be especially quickly melted down and can be, as required, broken up without great expense.

A preferred embodiment of the method according to the invention deserves special attention, especially due to environmental protection with simultaneous saving of raw materials. In this embodiment the de-metallized non-metallic portion not adhering to the metal body is also removed and the portions of same adhering to the metal body are separated from it by mechanical means, while in case of using fluxing agents or salts they are recycled to new remelting charges as a source of fluxing agents.

As appropriate pilot and operational experiments have shown, the method in its different versions makes a recycling of 6–70% of the fluxing agent and salts used feasible, so that now only more than 30–40% of the salts adhering to the oxides or the like have to be leached out and recovered crystallized by concentration. Thus a considerable reduction of the energy requirement for salt recycling can be achieved. Instead of using the thermal methods, like, for example, spray drying, used so far for the above mentioned concentration, a modern reverse osmosis or electro-dialysis method are preferably used or this in combination with the conventional method of de-salination.

At this stage emphatic reference is made to the fact that besides the technical problems, which are an obvious obstacle to an industrial application of centrifugal devices with continuous operation (therefore when removing the metal in liquid form), there are disadvantages and expenses of follow-up devices for the conveying of the metal in the heated form in a furnace or the like.

With its discontinuous operation, at which the centrifuge drum also serves as a casting mold, the method according to the invention makes it feasible for the first time to apply centrifuge devices effectively in the phase separation of metal-containing slags, dross and the like from the technico-economical and ecological points of view.

A preferred post-treatment can be especially useful for the environmental protection, in which residues of metal, therefore, for example, aluminum or aluminum carbide, aluminum nitride and the like, which are still present, can be transformed into harmless $Al_2O_3$. Herein the residues obtained after the centrifugal treatment for the purpose of conversion of the material residues and noxious metal compounds in it are subjected to post-oxidation or afterburning at elevated temperatures.

It has been found that for a high degree of de-metallization and a very effective separation of the metal phase and non-metal phase it is of special advantage that the to be separated phase mixture in the process is subjected in the first stage to an increasing, and in a second stage of longer duration to an essentially constant radial acceleration. At the same time the requirement of increased rotational velocity is in agreement with the starting process of the centrifuge. It should be mentioned here, that an increase of the number of revolutions in discontinuous stages, in particular at certain dross consistencies which hinder the de-metallization, promotes the de-metallization.

Proven parameters are, for example, in cases of a single charge of approx. 0.5% aluminum dross and a rotating mold with a diameter of approx. 1.5 m and length of 0.4 m, starting times of 0 to 800 RPM in the range of approx. 0.5–2 min, separation time at approx. 800 RPM (radial acceleration approx. 250 "g") is approx. 5–20 min, especially in the region of 15 min, wherein at the end of the stage of the constant number of revolutions the solidification is beginning or has taken place. The solidification phase may extend past the time necessary for this while the rotation slows down; in many cases the final setting can take place during the slowing down of the centrifuge. In the above described actual case during the de-metallization of an aluminum-containing salt slag a ring of metallic aluminum with an approx. 2 cm thickness is formed, to which on the inside an approx. 3.5 cm thick ring of aluminum oxide/salt mixture is joined, which is unexpected, as aluminum oxide has a greater density than the metallic aluminum. Finally, on the inside an equally 3.5 cm thick ring of a relatively purer, solidified salt melt (e.g. KClNaCl in ratios of about 4:6 to 6:4) is joined, which after breaking up by, for example, circular saw, stamping, crushing tool or the like, can be returned problem-free into the next remelting charge.

In a procedure which is favorable for the optimization of the output of the metal phase, chemical reactions, modification changes, wetting and entraining processes, or the like can be adjusted, if necessary, by solution processes, in an "operational manner" close to the optimum of the new method. Agents are added or admixed to be broken up phase mixture before or during the first process phase to influence at least one of the physical properties, like consistency, viscosity, melting range, thixotropy and surface tension, at least in one phase. "Barriers" in the dross bodies which can hinder the metal output can be dissolved or, for example, by adding CaO, a sandy, crumbling consistency of the residual body is achieved, which makes its removal, especially the removal of the parts adhering to the to be extracted metal phase considerably easier. As an example, let us mention here as fluxing agent the already mentioned salt melts, which are especially involved in case of aluminum reclamation, but also alkaline additives in the form of soda or oxide of calcium or acidic additives in the form of silicon dioxide, each of which together with $SiO_2$ or CaO can contribute to a slag formation, as this takes place, for example, in the reclamation of nickel from slags containing the latter.

Particularly important is the influencing of the surface tension of the individual phases among themselves, which is to be adjusted appropriately so, that on the one hand the metal phase's ability to flow, for example, is increased, but on the other it promotes and ensures the cohesion of the agglomerated metal droplets.

In an advantageous manner of the process, a direct uniform control of the temperature can be achieved in an elegant manner in at least one of the phases and consequently in its surroundings inside the centrifuge mold, as a result of which an increase of the de-metallization is achieved. Herein the to be broken up phase mixture before and/or during the first process phase the temperature of the metal phase is set, held and controlled by means of inductive energy supply. By changing the frequency of the alternating current supplied, in each case an optimum penetration depth of the induction current can be set.

A further essential object of the invention is a device for the removal of the desired separated metal phase in a solid form from a phase mixture. The device to carry out the method of this invention is characterized by at least one, if necessary exchangeable, centrifuge mold drum, which is provided in a housing or stand, which can be rotated at any desired rotational speed by means of controllable drive, is equipped with a conventional or inductive heating device, has a cross-section at a right angle to the axis of rotation symmetrical about one or several axes or is circular, has an inner space into which the phase mixture can be fed, while the surface of the cross-section increases or widens towards the discharge side. The envisaged "total conicity" of the opening angle towards the side of the removal can be between 0.5 and 15°, but preferably it is 5°. Even in case of phases which show volume expansion during solidification, it considerably facilitates the removal by an inherent thrust component of the body towards the side of removal. The cross-sections may be symmetrical or multi-axially symmetrical, e.g. to have a polygonal shape.

Star-shaped cross-sections with rounded edges can be also used.

Because it ensures a simple manufacture and handling, especially preferred is the circular cross-section, by which essentially a centrifuge with a truncated cone shape is obtained on the inside of the drum. The cross-section of the inner space of the centrifuge mold drum is shaped continuously increasing towards the discharge side with a geometrical similarity.

A particularly advantageous construction of the plant according to the invention makes yields with a high degree feasible and limits the expense for cleaning work between the individual charges, also facilitates the removal of the phases, as well as the maintenance work by having interchangeable inserts. At least the surfaces of the parts of the centrifuge mold or its drum which are in contact with the to be separated phase mixture are formed with a coating or replaceable inserts which at the phase separating temperature basically cannot be wetted by and/or do not react with the individual phases. In addition, the inside of the drum is protected by this against abrasion and chemical changes and consequently an increase of the operating time is achieved. Additionally or alternatively form separating agents or finishes are considered. The parts of the centrifuge mold and/or its drum are manufactured of cast iron, steel, graphite or a heat-resistant oxide, carbide, nitride, silicide or boride of at least one of the elements of the Mg, B, Al, Si group and of metals of the 4th to 6th sub-group of the periodic system, while cermet, boron nitride, silicon carbide, aluminum oxide or magnesium oxide are especially suitable, while especially the less wettable materials, graphite and boron nitride, are preferred.

In an embodiment of the centrifuge mold with an axis of rotation which changes its inclination the filling and the removal processes can be considerably facilitated. The centrifuge mold and/or its drum is constructed with an axis of rotation the inclination of which can be modified. Furthermore, in case of, for example, a vertical axis of rotation by reducing the rotational speed an undisturbed transformation of a body can be achieved, which has a practically tubular cylindrical inner surface at high rotational speed and a paraboloidal one at lower rotational speeds.

In an embodiment which is especially favorable as far as the process control and the quality of the to be produced product is concerned, the new centrifuge mold, besides the protection of the product, for example, by means of protective gas in case of aluminum dross, a transformation of a phase, for example, by means of oxidation or reduction of a phase can take place. The centrifuge mold has devices for the supply of a cooling medium and/or of flushing or protective gases to and-/or onto the drum and/or its inner space. With regard to the supply of a cooling medium, which is particularly useful for the control of the second process phase, a single spraying from the outside of the mold drum with water has proved itself to be excellent; the cooling effect is increased by the evaporation of the water.

This present invention concerns finally the use of centrifugal equipment, as described above, for disposing or recycling separation of a metallic phase from at least one non-metallic phase containing same from slags, salt slags, dross, residues and wastes which occur during the thermal metal extraction, production, processing, treatment and recycling, under the conditions that the metal/non-metal phase mixture is fed into a centrifuge mold at a temperature within the mentioned temperature range or after having been fed into it is brought to the temperature mentioned, there in a first process phase, while maintaining the temperature within the mentioned range, it is subjected to radial acceleration for a specified time until a required degree of de-metallization is achieved and that in a second phase of the process by maintaining the radial acceleration by means of rotation at least the metallic phase, separated and removed from the phase mixture and arranged on the outside periphery is brought to solidification or setting by lowering its temperature, after which the metal phase when reaching the handling temperature is removed as at least one body whose outer surface corresponds essentially to the shape of the inside of the centrifuge mold and whose inside has a paraboloidal or cylindrical surface. This method can further include the steps of separating aluminum and/or aluminum alloy from dross or slag containing it/them, and after de-metallization recycling same into a new smelt charge.

BRIEF DESCRIPTION OF DRAWINGS

The invention is explained in detail based on the drawing.

Hereinafter is a description of the preferred embodiments.

Figure 1:
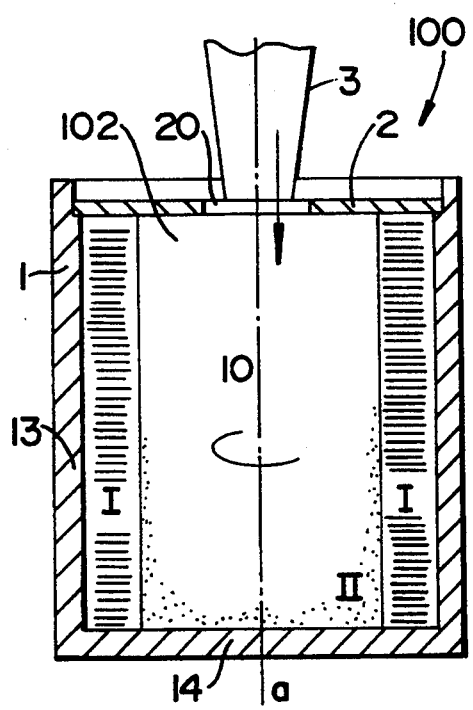
FIGS. 1, 2 and 5 show schematic sections through the centrifuge molds each with vertical axis of rotation, the first showing a uniform, and the others a stepped inner space.

According to FIG. 1 the centrifuge mold 100 with the vertical axis of rotation has a mold drum 1, whose jacket 13 is integral with the bottom 14. Together with the cover 2 on the discharge side 102 of the drum, which in case of the mold illustrated is identical with the feed side 101, it encloses an inner space 10 which opens slightly tapered towards the discharge side 102. Through an inlet 3 which protrudes into the opening 20 of the cover 2, the hot dross, slag and the like which are to be de-metallized, can be fed in, it will be then centrifuged and after the separation of the aluminum from the dross and its solidification during the further rotation, a tubular aluminum body I and a sand-like aluminum dross mass II having an approximately paraboloidal form and settled within the former are obtained, which after the removal of the cover 2 and the filling funnel 3, probably after a corresponding swivelling of the axis "a", can be removed problem-free, for example, by suction.

Figure 2:
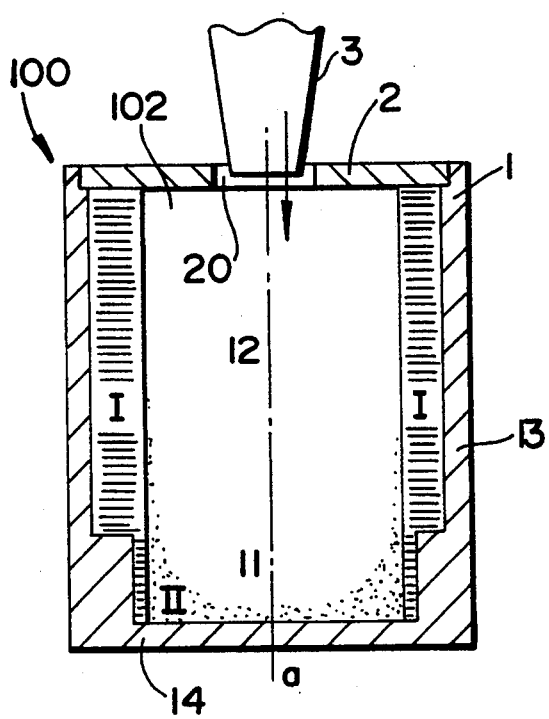

The centrifuge mold 100 of FIG. 2 is constructed similarly to that of FIG. 1, and the reference numerals designating the individual parts are identical with those of FIG. 1. The only constructive difference is the inner space 10, where a main chamber 12 is separated by a step from a kind of antechamber 11 having a smaller diameter. As it can be seen in FIG. 2, the advantage of this construction is that a more compact metal body I with a less-adhering dross II and an accumulation of same in the antechamber 11 can be achieved, due to which the contamination of the reclaimed metal by the dross can be kept especially low.

Figure 5:
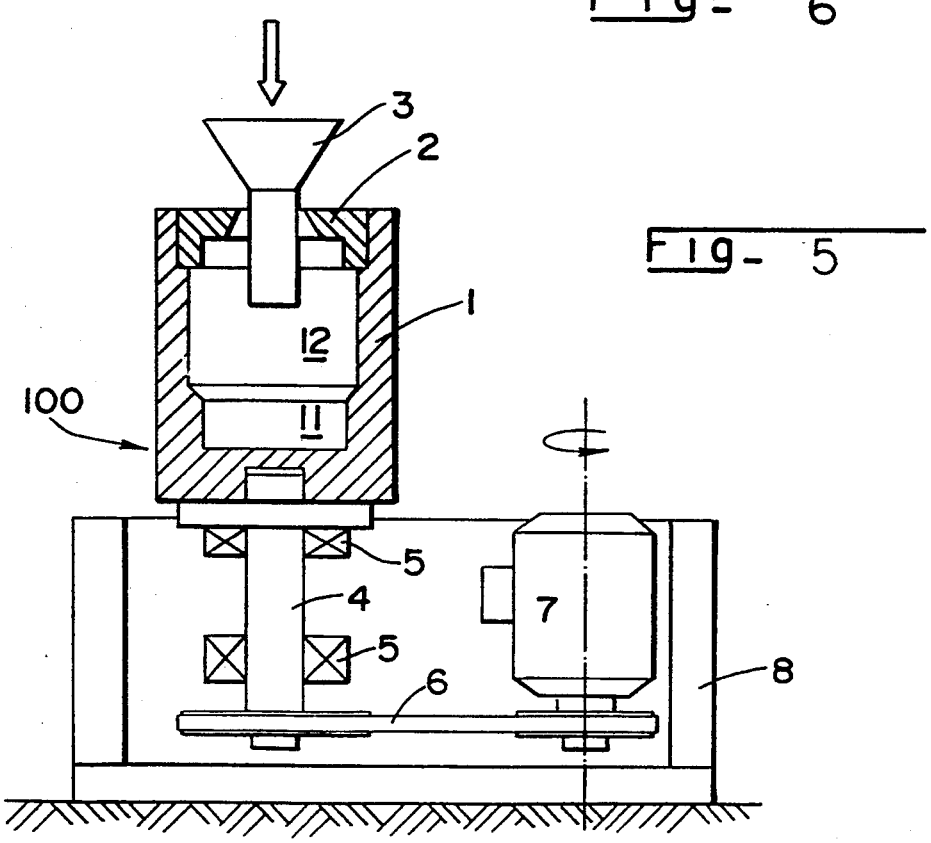

The mold 100, according to FIG. 5, is related to that of FIG. 2; it has (using the same reference numerals) an inclined transition from the antechamber 12 to the main chamber 11 of the drum 1. Furthermore, shown are the mounting 5 of the mold shaft 4, a drive motor 7 as well as its power transmission 6 and a stand 8 carrying the components mentioned.

It should be emphasized here that there is no intention to impose a limitation to dry dross, therefore the illustrated rotary molds can be fed with metal-containing slags or salt slags having, for example, pulp-like consistency.

Figure 3:
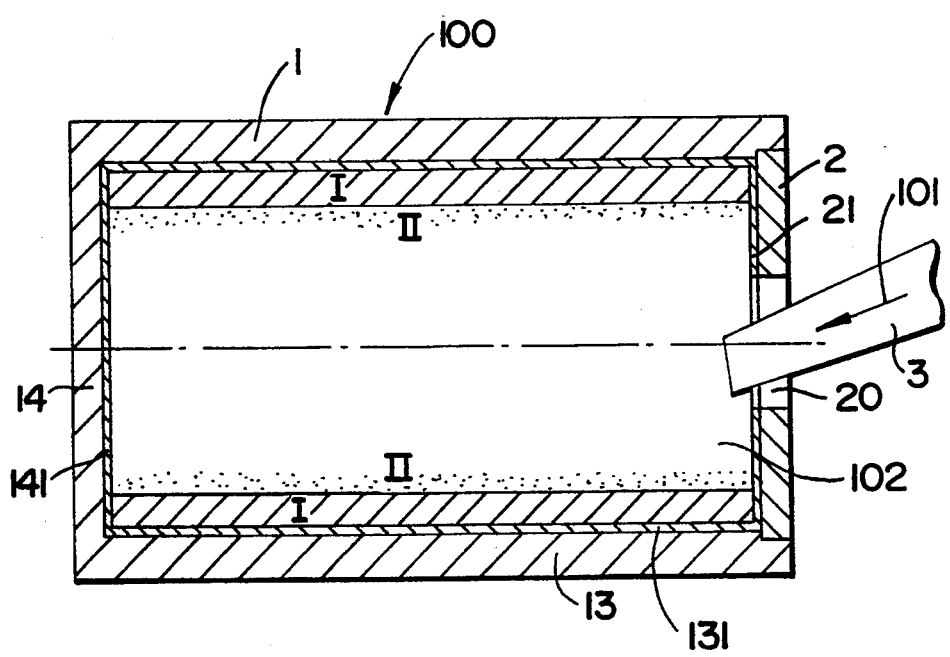
FIGS. 3 and 6 show such a mold with a somewhat horizontal axis of rotation, and FIG. 4 a diagram from which the degree of de-metallization of the aluminum dross as a function of the radial acceleration and of various working temperatures can be gathered.

Also in case of the centrifuge mold 100 illustrated in FIG. 3, which has an essentially horizontal axis of rotation, analogous parts are designated with the reference numerals explained in FIG. 1. There is, however, a difference in that the cylinder 1 is provided with a jacket and bottom coating 131, 141, made of, for example, refractory ceramic material, as is the cover 2 with the coating 21.

Figure 6:
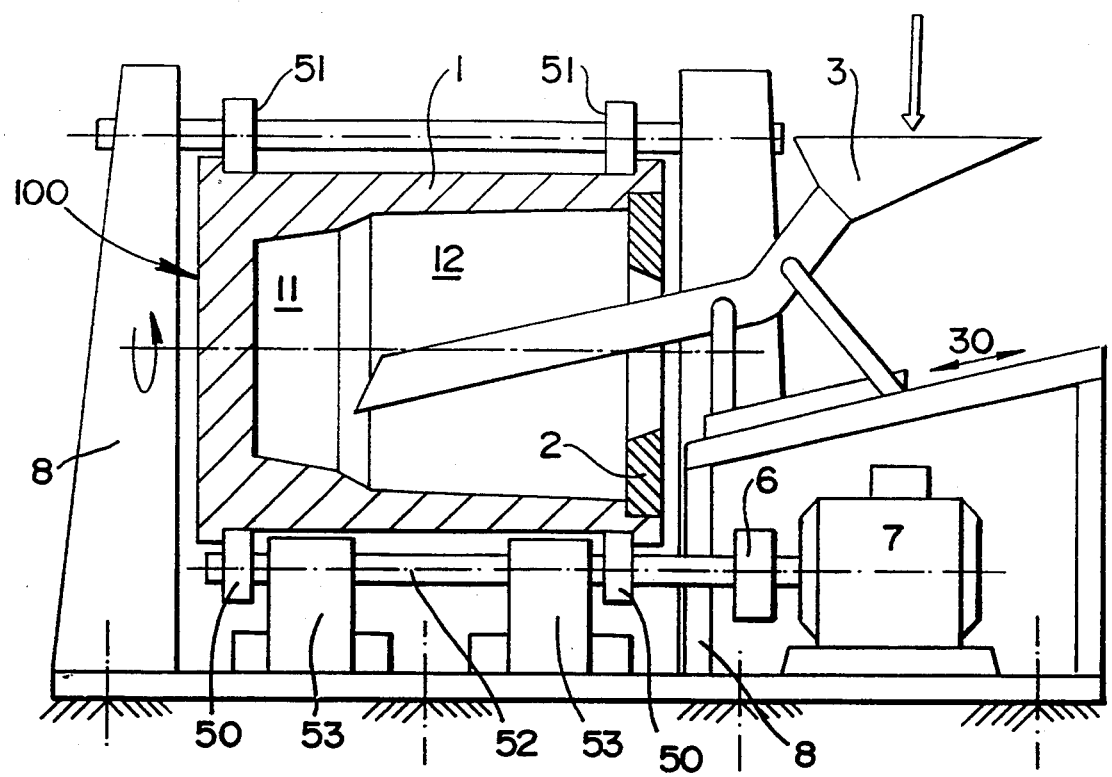

In case of the mold 100 according to FIG. 6, having a horizontal axis of rotation "a" with otherwise analogous reference numerals the inner space of the drum 1 has an inclined step from the main chamber 12 to the antechamber 11. The drum 1 with the free axis of rotation "a" is mounted on a support 5 with drive rollers 50 which are provided on a shaft 52 mounted in blocks 53 and driven by a motor 7 via a detachable clutch 6 and on idler rollers 51 mounted on the stand 8.

Figure 4:
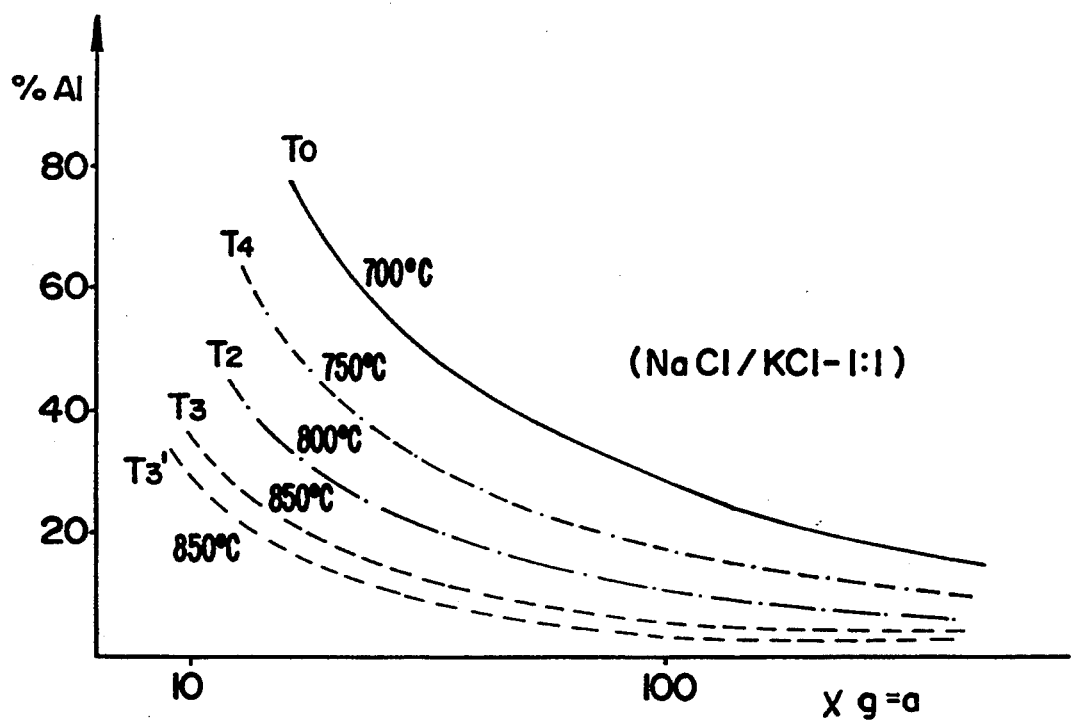

Finally, from the diagram shown in FIG. 4 for aluminum dross essentially with the same (70–80%) initial content of finely distributed metallic aluminum, for a number of technically interesting dross temperatures the achievable residual aluminum contents in the oxide can be read off for different radial accelerations in the centrifuge mold according to the invention.

Example 1: 20 kg of aluminum dross from an aluminum remelting furnace with a metallic aluminum content of approx. 75% by weight was drawn off from a smelt and fed at a temperature of approx. 800° C. into a centrifuge drum of a vertical type according to FIG. 1 or 2, made of steel, with an inside diameter of 400 mm and an inside height of 500 mm, so that approx. 25% of the inner volume was filled. After a start-up time of 1.5 min, a 600 RPM was held, so that in the outermost layer of the dross the radial acceleration was 80 g. The period of centrifugation at 800°–700° C. was 12 min. This was followed by cooling with sprayed water to the outside of the drum, the rotational speed was held for another 3 min, followed by slowing down. A closed ring of metallic aluminum with a mass of 15 kg was obtained. 5.2 kg $Al_2O_3$ of sand-like consistency remained which could be disposed of problem-free with a residual metallic aluminum of about 11% by weight.

Example 2: Same process as described in Example 1. With the difference that the aluminum dross was subjected to a radial acceleration of 160 g. The result was a closed ring of metallic aluminum with a mass of 15.5 kg and about 3.8 kg $Al_2O_3$ of sand-like consistency remained with an approx. 6% by weight residue content of metallic aluminum.

Example 3: The process was carried out as described in Example 1, but a centrifuge according to the principle of FIGS. 2, 4 and 5 was used, whose inside space with an inside diameter of 450 mm had a bottom part with stepped down smaller diameter of 350 mm and an internal height of 200 mm with an overall internal height of 500 mm and acted as an antechamber. The radial acceleration acting on the dross was 160 "g". A closed ring of metallic aluminum was obtained, with a mass of 15.7 kg, which was practically free of oxide inclusions. The residue had a residual aluminum content of 7% by weight.

Example 4: The process was carried out in principle as in Example 1, while the wall of the mold drum (1° wall incline, 1500 mm diameter, height 400 mm, without inner space step, cast iron lining) was heated from the outside by induction coils, so that the mold had a temperature of 680° C. An aluminum containing salt slag was supplied from an aluminum smelting plant, having 9% by weight aluminum. The radial acceleration was 220 "g", duration 15 min, at 680° C. This was followed by cooling by sprayed water during further rotation with 220 "g" for 3 min, followed by slowing down and braking of the rotating mold.

An aluminum ring (220 kg, thickness 2.2 cm), smoothly detached from the wall of the centrifuge was obtained, followed towards the center of the ring by a ring with approx. 80% $Al_2O_3$ in a KCl–NaCl (1:1) matrix and a thickness of 3.8 cm and inside of this with a sharp border a "pure salt" ring (KCl, NaCl) having a 4.0 cm thickness. The internal salt ring could be separated mechanically from the $Al_2O_3$ ring and was added to a scrap aluminum smelt as salt slag former.

After the removal of the solidified oxide-salt suspension from the metal ring it was leached with water, the unsoluble, still damp $Al_2O_3$ was recycled into a bauxite digesting plant, and the salt obtained from the salt brine was crystallized by spray drying, which salt could be reused again as fluxing agent for the preparation of the salt slag.

The aluminum ring obtained was united in a remelting furnace with the smelt used there.

The aluminum residue in the salt slag was altogether 0.3% by weight.

The advantages of the invention are summarized here, as a matter of fact based on the recovery of metallic aluminum containing slags.

60–70% of the salt present in the salt slag can be mechanically reclaimed, therefore do not need leaching with water and energy intensive evaporation of water; this means approximately 60–70% energy saving during the salt reclamation in comparison with the known method.

Due to the difference in densities, practically all impurities originating from aluminum smelters, like carbide, fluoride, oxide and nitride of aluminum are separated from the salt or salt mixture.

The residual aluminum, as well as the aluminum carbide and aluminum nitride can be transferred into harmless aluminum compounds by afterburning and can be fully dumped.

The accompanying materials enrich themselves in the dross and slags and due to their high concentration the energy requirement for the "afterburning" of the dross or slag is small.

We claim:

1. A method for disposing or recycling separation of a metallic phase from at least one phase mixture containing the metallic phase from slags, salt slags, dross, residues and wastes which occur during the thermal metal extraction, production, processing, treatment and recycling, while the phase mixture for the purpose of demetallization is subjected by rotation to a radial acceleration within a centrifuge device including a centrifuge mold, and within a temperature range which is above one of the melting temperature or the melting range of the metallic phase, wherein said metallic phase is one of aluminum and an aluminum alloy, said method comprising:
feeding the phase mixture, in a batch operation, into the centrifuge mold at one of a temperature within the mentioned temperature range;
bringing the phase mixture to the temperature after feeding the phase mixture into the centrifuge mold;
subjecting the phase mixture, in a first process phase, while maintaining the temperature within the mentioned range, to radial acceleration for a specified time until a required degree of de-metallization is achieved;
maintaining the radial acceleration by means of rotation, in a second phase of the process, such that at least the metallic phase, which is separated and removed from the phase mixture and arranged on an outside periphery of the centrifuge mold is brought to one of solidification and setting by lowering the temperature thereof; and
removing the metallic phase when reaching a handling temperature, as at least one body, whose outer surface corresponds essentially to the shape of the inside of the centrifuge mold and whose inside has a paraboloidal or cylindrical surface.

2. The method of claim 1, further comprising
a first charge of the phase mixture until a metallic phase of the first charge of the phase mixture, which orientates towards the outside periphery of the centrifuge mold, solidifies or sets;
bringing, at least a second charge of the phase mixture into the centrifuge mold during continuing rotation, at the temperature of the first process phase, and subjecting the metallic phase of the second charge of the phase mixture to radial acceleration by rotation within the temperature range above the melting point of the metallic phase;
reducing the temperature of the metallic phase of the second charge of the phase mixture, the metallic phase of the second charge of the phase mixture arranged within the solidified first charge and bordering same;
bringing the metallic phase of the second charge of the phase mixture to one of setting and solidification to form a metallic phase body having at least two layers; and
removing the metallic phase body.

3. The method of claim 1, wherein a first charge of said phase mixture is subjected to said first process phase and that during continued rotation at least a second charge of the phase mixture is fed into the centrifuge mold at a temperature envisaged for the first process phase, said phase mixture being subjected there to radial acceleration by rotation within a temperature range above the melting point of the metallic phase, followed by one of the solidification and setting of the one-piece metal body and, finally, by removal of the one piece metal body.

4. The method of the claim 1, wherein the phase mixture is subjected in a first stage to an increasing radial acceleration, and in a second stage of longer duration, to an essentially constant radial acceleration.

5. A centrifuge device for disposing or recycling separation of a metallic phase from at least one phase mixture containing same from slags, salt slags, dross, residues and wastes which occur during the thermal metal extraction, production, processing, treatment and recycling, while the phase mixture for the purpose of de-metallization is subjected by rotation to a radial acceleration within a centrifuge device including a centrifuge mold, within a temperature range which is above one of the melting temperature or the melting range of the metallic phase, wherein said metallic phase is one of aluminum and an aluminum alloy, the centrifuge device disposing or recycling separation of the metallic phase by feeding the phase mixture, in a batch operation, into the centrifuge mold at one of a temperature within the mentioned temperature range and after having been fed into the centrifuge mold and bringing the phase mixture to the temperature mentioned, subjecting the phase mixture, in a first process phase, while maintaining the temperature within the mentioned range, to radial acceleration for a specified time until a required degree of de-metallization is achieved; by maintaining the radial acceleration by means of rotation, in a second phase of the process, at least the metallic phase, separated and removed from the phase mixture and arranged on an outside periphery of the centrifuge mold is brought to one of solidification and setting by lowering the temperature thereof, and removing the metallic phase when reaching the handling temperature as at least one body whose outer surface corresponds essentially to the shape of the inside of the centrifuge mold and whose inside has a paraboloidal or cylindrical surface,
said centrifuge device comprising:
at least one, if necessary exchangeable, centrifuge mold including a centrifuge mold drum having a variable cross section and a discharge side;
a housing for rotatably supporting the centrifuge mold drum;
controllable drive means for rotating the centrifuge mold drum at any desired rotational speed one of a conventional and inductive heating device for heating the centrifuge mold drum, the centrifuge mold drum having a cross-section at a right angle to the axis of rotation of the centrifuge mold drum symmetrical about one or several axes or is circular, the centrifuge mold drum having an inner space into which the phase mixture can be fed, while the surface of the cross-section of the centrifuge mold drum increases or widens towards the discharge side thereof.

6. The centrifuge device of claim 5, wherein at least portions of the surfaces of one of the centrifuge mold and the centrifugal drum, which are in contact with the phase mixture, are formed with a coating or replaceable inserts, which at the phase separating temperature cannot be wetted by, and do not react with the individual phases that constitute the phase mixture.

7. The centrifuge device according to claim 5, wherein the centrifuge mold further comprises a device for supplying a cooling medium, a device for flushing, and a device for supplying protective gases onto one of the drum and an inner space of the device.

8. A method for using a centrifuge device,
said centrifuge device including at least one, if necessary exchangeable, centrifuge mold including a centrifuge mold drum having a variable cross section and a discharge side, a housing for rotatably supporting the centrifuge mold drum, controllable drive means for rotating the centrifuge mold drum at any desired rotational speed one of a conventional and inductive heating device for heating the centrifuge mold drum; the centrifuge mold drum having a cross-section at a right angle to the axis of rotation of the centrifuge mold drum symmetrical about one or several axes or is circular, the centrifuge mold drum having an inner space into which the phase mixture can be fed while the surface of the cross-section of the centrifuge mold drum increases or widens towards the discharge side thereof, said method for using said centrifuge device being for one of disposing and recycling separation of a metallic phase, wherein said metallic phase is one of aluminum and an aluminum alloy, from at least one phase mixture containing same from slags, salt slags, dross, residues and wastes which occur during the thermal metal extraction, production, processing, treatment and recycling, under the conditions of feeding the phase mixture into a centrifuge mold at a temperature within a temperature range which is above one of the melting temperature of the metallic phase and after having been fed into the centrifuge mold and bringing the phase mixture to the temperature, said method for using the centrifuge device comprising:

subjecting the phase mixture, in a first process phase, while maintaining the temperature within the temperature range, to radial acceleration for a specified time until a required degree of de-metallization is achieved;

maintaining the radial acceleration by means of rotation, in a second phase of the process, wherein at least the metallic phase, separated and removed from the phase mixture and arranged on an outside periphery of the centrifuge mold, is brought to one of solidification and setting to form a metallic phase body by lowering the temperature thereof; and removing the metallic phase body when reaching the handling temperature, the metallic phase body having an outer surface which corresponds essentially to the shape of the inside of the centrifuge mold and an inside surface of a paraboloidal or cylindrical shape.

9. The method of using the centrifuge device of claim 8, further comprising the steps of:

separating one of aluminum and aluminum alloy from one of dross and slag containing said one of aluminum and aluminum alloy, and recycling said one of aluminum and aluminum alloy into a smelt charge after the de-metallization.

* * * * *